C. COMSTOCK.
Steam-Plow.
No. 35,218. Patented May 13, 1862.
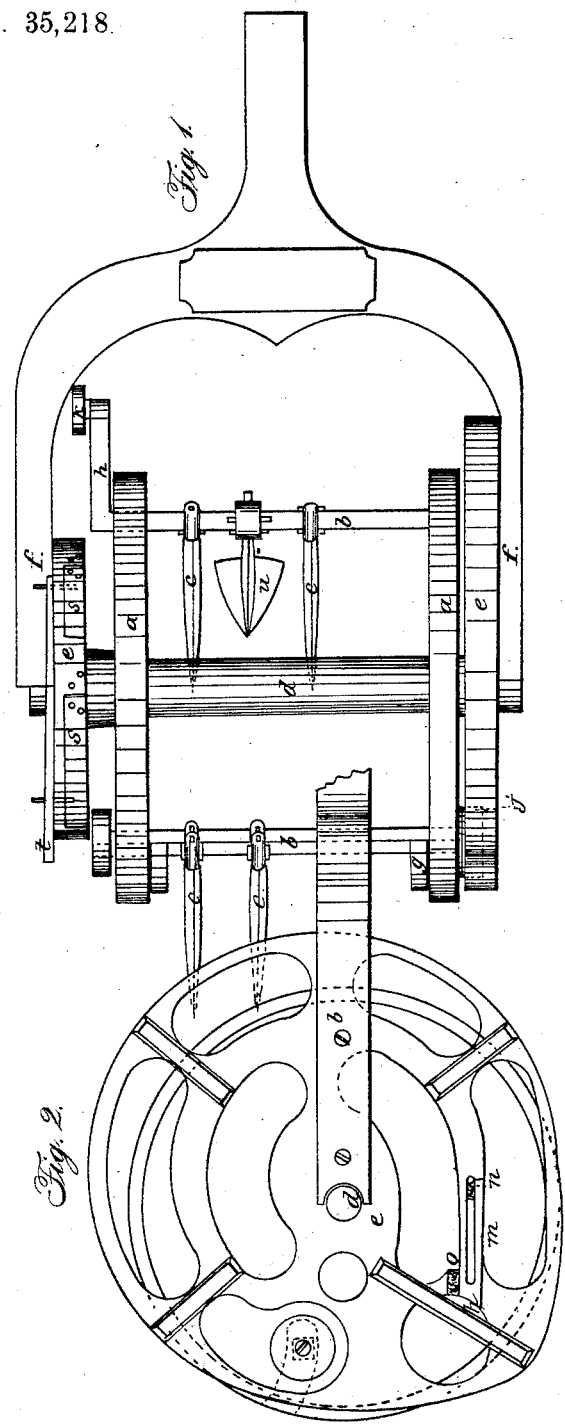
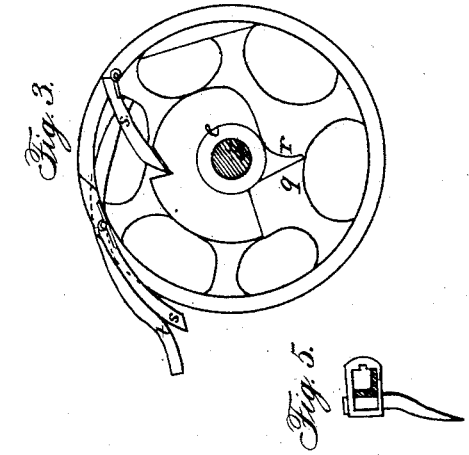
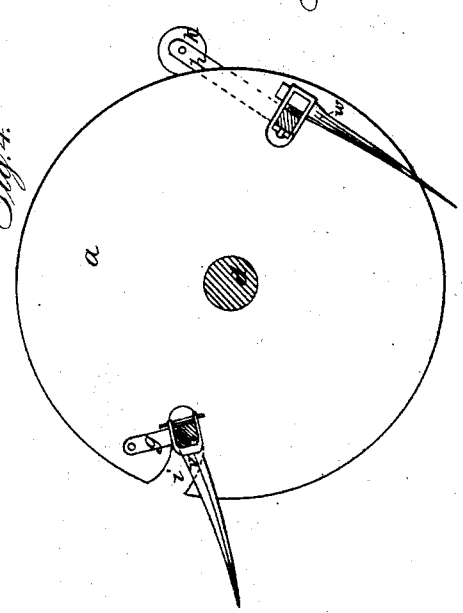
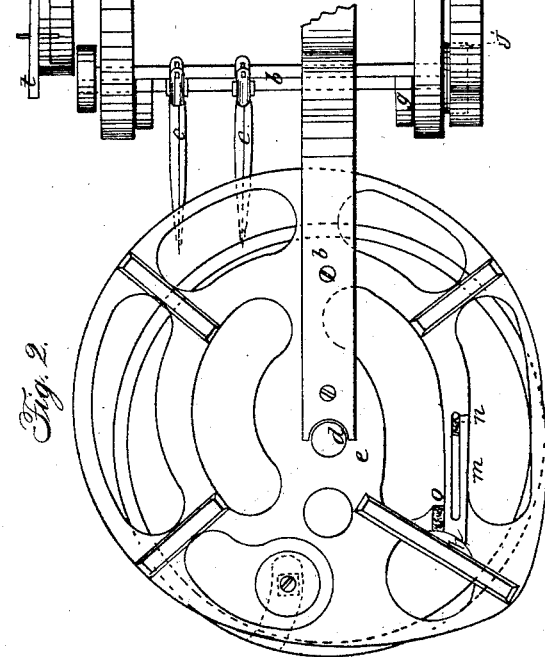
Witnesses:
Geo. C. Lambright
J. B. Jones
Inventor:
C. Comstock
by atty Thos. T. Everett

UNITED STATES PATENT OFFICE.

CICERO COMSTOCK, OF MILWAUKEE, WISCONSIN.

IMPROVEMENT IN ROTARY PLOWS.

Specification forming part of Letters Patent No. 35,218, dated May 13, 1862.

*To all whom it may concern:*

Be it known that I, CICERO COMSTOCK, of the city of Milwaukee, in the State of Wisconsin, have invented certain new and useful Improvements on Rotary Plows or Spading-Machines; and I do hereby declare the following to be a full, clear, and exact description thereof, reference being had to the accompanying drawings, and to the letters and marks thereon.

By the drawings forming part of this specification is represented a rotary plow or spading-machine having my improvements, Figure 1 thereof being a top view of the machine, in which two shafts for the teeth only and with part of the number of the teeth thereon are shown; Fig. 2 being a side view of one of the cams of the machine; Fig. 3 being also a side view of one of the cams of the machine; Fig. 4 being a side view of the inner side of one of the wheels; and Fig. 5 being a transverse section of one of the tooth or spade shafts, showing a tooth connected therewith by a stirrup and key.

Although these improvements are here shown as attached to one machine, as is evident, a part of them may be attached to other machines and thus used independent of the other parts.

The wheels $a$, to which are connected the shafts $b$ of the teeth $c$, in their rotation carry with them the axle $d$, which has its bearings in the cams $e$, these cams being attached to the frame $f$ of the machine. The shafts carrying the teeth or spades are hung inside of the periphery of the wheels, and are alternately actuated by the cams; the shaft having the handle $g$ pivoted to the inner side of the wheel being acted upon by the cam on one side, and the shaft having the handle $h$ on the outside of the wheel being acted upon by the cam on the other side. The shaft having the handle $g$ plays in a slit, $i$, in the wheel, and has on its end a friction-roller, $j$, which traverses the groove of its cam, while the shaft having the handle $h$ plays through a hole in the wheel, and its handle has a friction-roller, $k$, which traverses the groove of its cam. The shafts to which the spades or teeth are attached are hung inside of the periphery of the wheel to prevent the contact of the shafts with the ground, and the teeth or spades are so much the longer thereby, thus preventing clogging. By having the shafts so constructed and arranged that they may be alternately acted upon by the cams, as here recited, longer handles may be used and larger friction-wheels than would otherwise be practicable.

The form and size of the cam-grooves will be due to the length of the handles, their special position, and the size of the friction-roller and the angle at which the handles stand in reference to the tooth or spade and the cut and lift to be made. The cam-grooves will have the proper form to secure the proper entrance of the spade into the earth, to the lifting of the soil, and to produce a drop action and jar to pulverize the earth and to discharge it. The point of pressure of the shaft governed by the cam shown by Fig. 2 is along the surface marked $m$, which, it will be perceived, is made elastic by the introduction of india-rubber at the slitted point $n$ and at the point $o$, where a portion of the solid part is removed. A spring may here be used in the place of the rubber and the wood. This will relieve the parts from the strain in the first movement in lifting the earth. The length of this part $m$ will be regulated so as to increase or diminish the scooping action in lifting. The dropping-point is marked $p$, and is near the point $o$.

The point of pressure of the cam shown by Fig. 3 is at $q$, and as the friction-roller of the handle passes this point and glides into the recess $r$ the shaking and dropping motions occur.

The cams may be constructed with hinged sections $s\ s$ at the top, as shown by Fig. 3, or at other proper points, acted upon by a lever, $t$, or by levers, to allow the friction-rollers to be turned out of the grooves and the shafts with the spades or forks to be folded up, to relieve them of strain in turning and for moving about without working, and the turning of them in again, when desired, for work.

Instead of the shaft of the teeth being attached to the wheel by a handle, $g$, pivoted to the wheel, the shaft may be hung by the handle being connected to an arm, in which case a pair of rollers of the proper dimensions may be required outside of the cams for traction or to prevent embedding too deep in the earth.

To invert the turf, a short blade or spade, $u$, is introduced between the teeth $c\ c$ to cut the intervening space and allow the teeth to have the length and action required to produce the desired result.

The teeth or spades may be attached to the shaft at the central line of the shaft, as at *v*, Fig. 4; or they may be set on the forward side of the shaft, as indicated by *w* of the same figure. This latter way of setting the teeth will aid in insuring the contact of the friction-rollers with that part of the cam which governs their entrance into the earth and counteract any tendency of the machine to ride ahead on the teeth, and also to obtain a scooping action in lifting the earth, as well as to admit of a more perfect folding when not working.

The teeth or spades may be secured to the shaft rigidly; but I prefer to affix them to the shafts by keys or pins, with the box or cap, as shown by Fig. 4, or by stirrup and key, as shown by Fig. 5. Whether affixed by the one way or the other, I have placed between the head or cap or stirrup and the shaft india-rubber, as indicated by red marking in the Figs. 1, 4, and 5 of the drawings, which gives, by its elasticity, protection both to the teeth and the shafts from being broken, while the use of pins or keys and caps or boxes or stirrups give facilities for replacing the teeth.

What I claim as my invention, and desire to secure by Letters Patent, as improvements in rotary plows or spading-machines, is—

1. Hanging the spade or fork shafts inside of the periphery of the wheel, as set forth.

2. Connecting the tooth or spade to the shaft forward of the shaft, as recited.

3. The introduction of india-rubber between the box or cap of the tooth and the shafts to give elasticity and protection to the tooth and shaft, as described.

4. The hinge-sections of the cams for allowing of the folding up of the forks or spades.

5. Hanging the spade's or fork's shaft to the wheels or arms by the handles, as described.

6. Providing that part of the cam which receives the pressure of the spade or fork's shaft with the spring or elastic bearing.

This specification signed this 8th day of February, 1862.

CICERO COMSTOCK.

Witnesses:
 CARLOS GLIDDEN,
 EMD. T. ELLIS.